(12) United States Patent
Sheahan, Jr. et al.

(10) Patent No.: US 8,876,063 B2
(45) Date of Patent: Nov. 4, 2014

(54) FLIGHT CONTROL USING MULTIPLE ACTUATORS ON PRIMARY CONTROL SURFACES WITH TABS

(75) Inventors: James J. Sheahan, Jr., Florissant, MO (US); Charles E. Morris, Des Peres, MO (US); Jeffrey M. Roach, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 1015 days.

(21) Appl. No.: 11/953,567

(22) Filed: Dec. 10, 2007

(65) Prior Publication Data
US 2009/0146003 A1    Jun. 11, 2009

(51) Int. Cl.
*B64C 9/10* (2006.01)

(52) U.S. Cl.
USPC ........................................ 244/178; 244/99.14

(58) Field of Classification Search
USPC ............. 244/99.14, 99.2, 99.3, 178, 82, 76 A
See application file for complete search history.

(56) References Cited

U.S. PATENT DOCUMENTS

| | | | | |
|---|---|---|---|---|
| 3,378,217 A | * | 4/1968 | Diani | 244/178 |
| 4,171,113 A | * | 10/1979 | Townsend | 244/221 |
| 4,431,149 A | | 2/1984 | Brislawn et al. | |
| 4,765,572 A | * | 8/1988 | Bellego et al. | 244/178 |
| 5,913,492 A | * | 6/1999 | Durandeau et al. | 244/82 |
| 6,257,528 B1 | * | 7/2001 | Brislawn | 244/211 |
| 6,349,900 B1 | * | 2/2002 | Uttley et al. | 244/82 |
| 7,051,976 B2 | * | 5/2006 | Boe et al. | 244/75.1 |
| 2004/0251383 A1 | | 12/2004 | McDonnell | |

* cited by examiner

*Primary Examiner* — Brian M O'Hara
(74) *Attorney, Agent, or Firm* — Parsons Behle & Latimer

(57) ABSTRACT

A flight control system for an aircraft directs a primary surface that is pivotable with respect to the aircraft with a moveable tab located at the end of the primary surface. A primary surface actuator maintains a position of the primary surface. A tab actuator moves the tab with respect to the primary flight control surface. A controller configured to coordinate the movement of the primary flight control surface with the movement of the tab by deflecting the tab with respect to the primary flight control surface, thereby allowing aerodynamic forces acting upon the deflected tab to position the primary flight control surface at a desired position. The primary flight control surface can then be maintained at the desired position by the primary surface actuator.

19 Claims, 6 Drawing Sheets

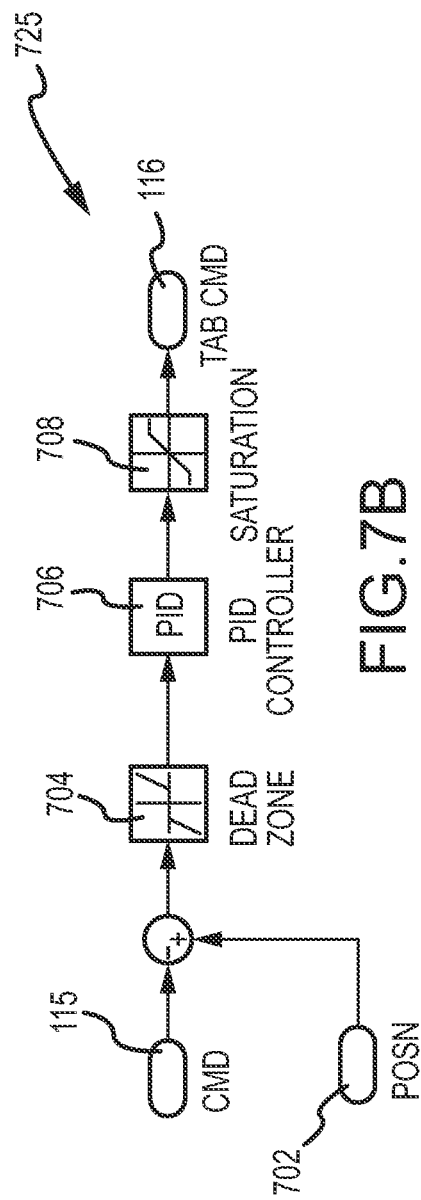
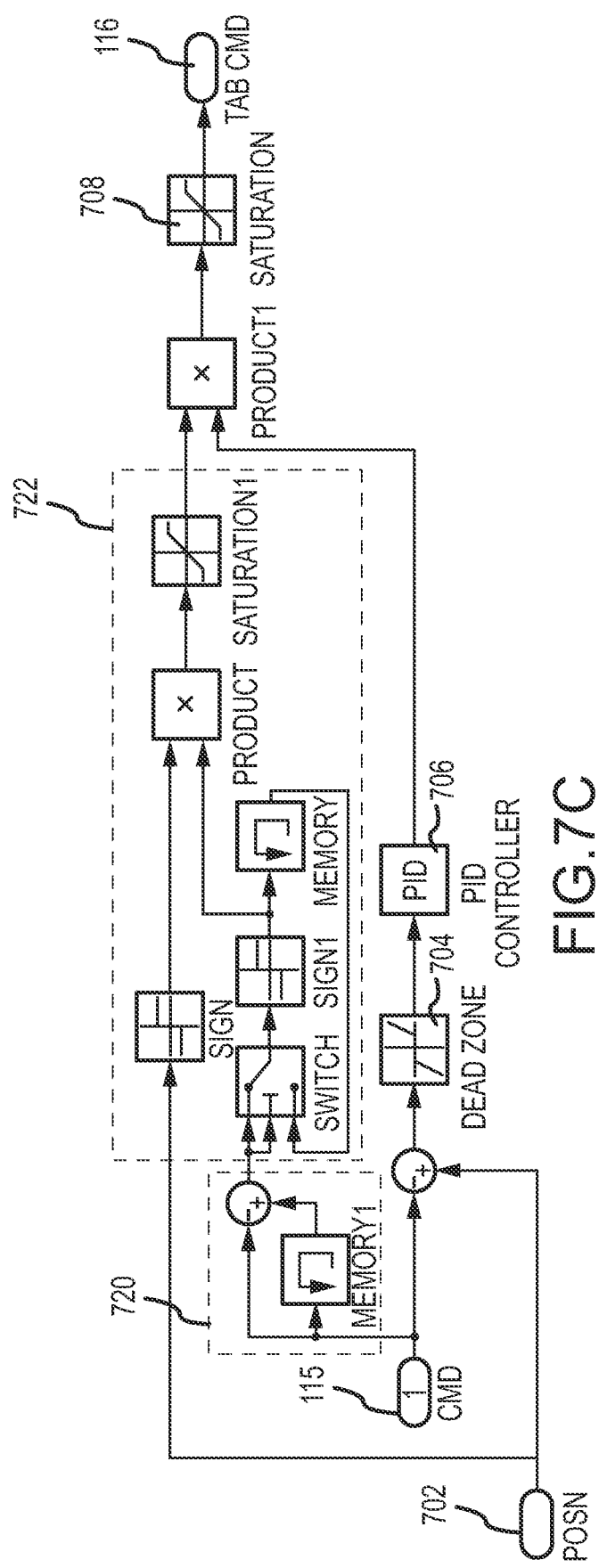
FIG.7B
FIG.7C

FLIGHT CONTROL USING MULTIPLE ACTUATORS ON PRIMARY CONTROL SURFACES WITH TABS

TECHNICAL FIELD

The embodiments described herein generally relate to flight controls for aircraft. More particularly, the embodiments described herein relate to flight controls that incorporate primary control surfaces with tabs.

BACKGROUND

Conventional aircraft are guided by various flight control surfaces such as rudders, ailerons, flaps, elevators, stabilizers and/or the like. These flight controls are typically moveable on the exterior surface of the aircraft to affect the flow of air in accordance with the principles of aerodynamics, and are widely deployed in various types of manned or unmanned aircraft (including both fixed and rotary-wing aircraft), as well as various missiles, rockets and/or the like.

More recently, aircraft have been designed to be larger and more complex in various ways. The migration to so-called "flying wing" and other tailless aircraft designs, for example, represents a choice to design aircraft with improved performance, but potentially with less aerodynamic stability. The stability of such aircraft is typically recouped through the use of larger control surfaces and/or faster control rates. Such designs, however, can be somewhat disadvantageous in that the larger surfaces frequently undergo larger aerodynamic loads than comparatively smaller surfaces, thereby demanding additional power to overcome such loads. Faster control rates similarly impose increased power demands. The increased demands for electrical and/or hydraulic power can limit the effective range or performance of the aircraft, and/or can reduce the size of the aircraft payload. Improved power consumption and/or hydraulic power plant size would therefore improve the range, performance and/or payload capacity of the aircraft. As a result, it is desirable to produce control surfaces that conserve electric and/or hydraulic power, or at least use as little power as possible.

BRIEF SUMMARY

According to various embodiments, a flight control system for an aircraft directs a primary surface that is movable with respect to the aircraft with a moveable tab located at the end of the primary surface. A primary surface actuator is used to maintain a desired position of the primary surface and obtain the desired rates to reach its commanded position. A tab actuator moves the tab with respect to the primary flight control surface. A controller configured to coordinate the movement of the primary flight control surface with the movement of the tab by deflecting the tab with respect to the primary flight control surface, thereby allowing aerodynamic forces acting upon the deflected tab to position the primary flight control surface at a desired position. The primary flight control surface can then be maintained at the desired position by the primary surface actuator.

In other embodiments, a method of controlling a primary flight control surface of an aircraft is provided. The primary flight control surface has a tab located at an end thereof that is moveable with respect to the primary flight control surface. The actuation of the tab is directed to deflect the tab with respect to the primary flight control surface. Aerodynamic forces are allowed to act upon the deflected tab to position the primary flight control surface at a desired position. The primary flight control surface is subsequently maintained at the desired position.

Still other embodiments provide a flight control for an aircraft. The flight control comprises a primary surface that is pivotable with respect to the aircraft, as well as a primary surface actuator coupled to the primary surface and configured to maintain a position of the primary surface. A tab is located at an end of the primary surface and coupled to the primary surface to allow movement of the tab with respect to the primary surface, and a tab actuator is coupled to the tab and configured to rotate the tab with respect to the primary surface. A controller coupled to the primary surface actuator and to the tab actuator, wherein the controller is configured to coordinate the movement of the primary surface with the movement of the tab.

Other embodiments, as well as various other features and aspects of various embodiments, are described in increasing detail below.

BRIEF DESCRIPTION OF THE DRAWINGS

Various embodiments will hereinafter be described in conjunction with the following drawing figures, wherein like numerals denote like elements.

FIGS. 7B-C are block diagrams of exemplary control techniques suitable for use in generating a tab control signal;

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Various embodiments conserve electrical and/or hydraulic power consumed by a flight control system by coordinating the movement of a primary flight control surface with the movement of a tab located at the trailing end of the primary surface. By actuating the tab upwardly and/or downwardly with respect to the primary surface, aerodynamic effects produced by the tab can be exploited to place the primary surface into a desired position with comparatively little or no applied actuation power. When the primary surface is placed into a desired position, it may be locked in place (e.g. with an active or passive actuator), and the tab may be faired to increase the surface area of the primary control. While it is recognized that tabs have been applied to control surfaces for reduction of input power, the conventional approach proportionally reduces the effective area of the control surface. Using the various techniques and systems described herein, a significant reduction in electrical and/or hydraulic power can be achieved while retaining a substantial portion, if not the full effective area, of the control surface system.

Figure 1A:
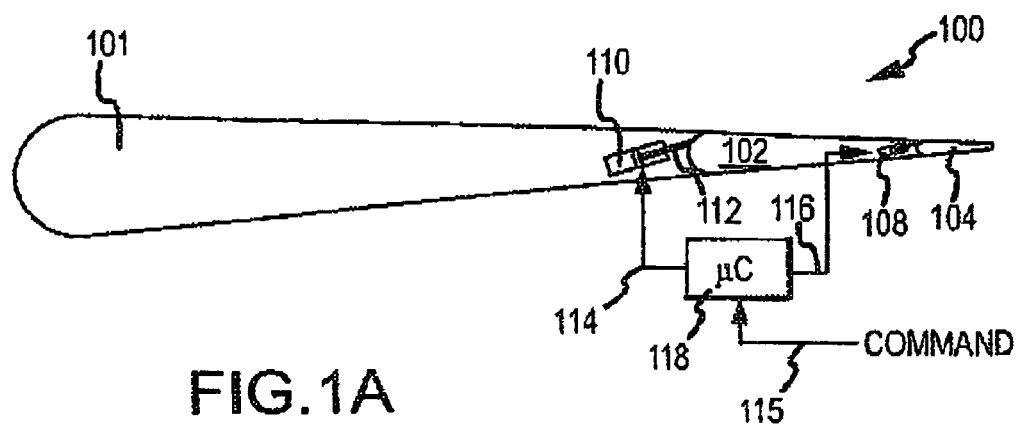
FIG. 1A is a block diagram of an exemplary flight control system suitable for use as a trailing edge of an airfoil with a tab.

With reference to FIG. 1A, an exemplary flight control system 100 suitable for deployment at the trailing edge of a wing or other airfoil 101 suitably includes a primary control surface 102 (also referenced as "primary surface 102"), as well as a tab 104. Typically, primary surface 102 is moveable with respect to airfoil 101, and tab 104 is moveable with respect to primary surface 102. Tab 104 is generally moved by a tab actuator 108, which is mechanically coupled to tab 104 as appropriate. Primary surface 102 may be positioned in response to mechanical force applied by surface actuator 110; alternatively, tab 104 may be positioned to create aerodynamic effects that are able to move primary surface 102 with respect to airfoil 101 with little or no applied external force. Controller 118 therefore coordinates the movement of primary surface 102 with movement of tab 104 as appropriate and desired; desired movements of control surface 102 and/or tab 104 may be indicated by one or more control signals 115 in any manner.

Airfoil 101 is any surface of an aircraft 150 or other vehicle that is capable of generating lift and/or other aerodynamic force to affect the orientation or heading of the vehicle. In various embodiments, such as in the embodiment illustrated in FIG. 1B, airfoil 101 is represented by wings 101A-B of aircraft 150, with associated primary surfaces 102A-B representing an elevon, aileron, flap and/or other control structure on the trailing edges of airfoils 101A-B, and with trailing tabs 104A-B. Other embodiments may place control surfaces 102A-B on the leading edges of airfoils 101A-B, with tabs 104A-B located on the leading or trailing edges of control surfaces 102A-B as desired. In still other embodiments, airfoil 101 represents a vertical tail of an aircraft, with primary surface 102 representing a rudder or other control surface as appropriate. Still other embodiments of airfoil 101 may represent horizontal stabilizers, canards, and/or any other surfaces of aircraft 150 as appropriate. Primary surface 102, then, is any surface capable of actuating or otherwise moving with respect to airfoil 101 or another point on the vehicle. While primary surface 102 is shown at the tail end of airfoil 101, alternate embodiments may be designed where primary surface is located at another point (e.g. on a top or bottom surface) of airfoil 101. Similarly, primary surface 102 may be designed to move in any manner with respect to airfoil 101, including any sort of rotational (clockwise and/or counter-clockwise) and/or lateral movement as appropriate.

Figure 2:
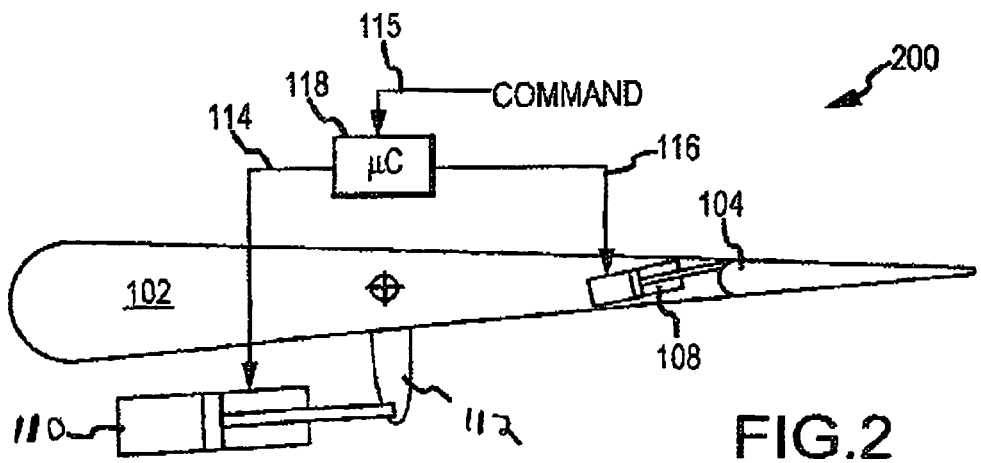
FIG. 2 is a block diagram of an exemplary flight control system suitable for use as an airfoil with a tab.

FIG. 2 shows an alternate embodiment wherein the primary surface 102 and tab 104 form an airfoil 200 in the absence of an additional wing or other structure. Such embodiments may implement, for example, an aileron, elevon, rudder, flap, elevator and/or other control structure. Whether or not an extraneous airfoil structure 101 is present, the operation of tab 104 can be used to place primary surface 102 into a desired position.

Figure 1B:
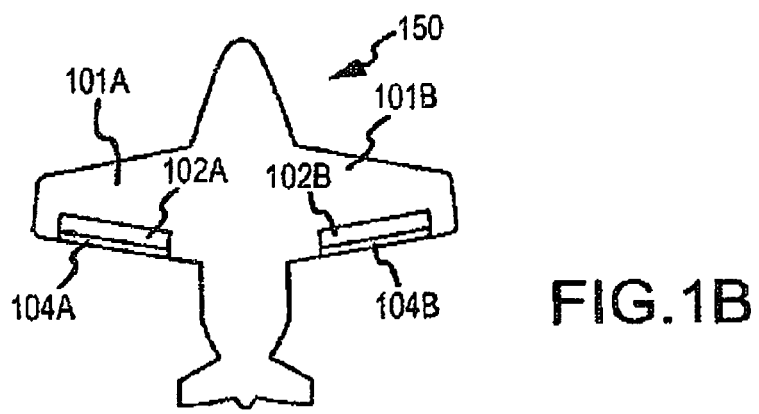
FIG. 1B is a diagram of an aircraft with tabbed control surfaces located on the trailing edges of the wings.

With combined reference to FIGS. 1A-B and 2, tab 104 is any mechanical structure that is movable with respect to primary surface 102. In various embodiments, tab 104 is located at the tail end of primary surface 102 and is hinged or otherwise allowed to rotate in a clockwise and/or counter-clockwise manner with respect to primary surface 102. Tab 104 may be any suitable size and shape; in various embodiments, tab 104 may make up approximately 10-20% of the surface chord formed by the combination of primary surface 102 and tab 104, although other embodiments may include larger or smaller tabs as appropriate.

Tab 104 is mechanically actuated in any manner. In various embodiments, tab actuator 108 actuates tab 104 as desired. Actuator 108 is any sort of electrical, electro-mechanical, hydraulic or other device capable of displacing tab 104 as described herein. In various embodiments, actuator 108 is an electro-hydraulic actuator that receives control signals 116 from controller 118, and that actuates tab 104 as indicated by the received signals 116. Actuator 108 may be mechanically coupled to tab 104 in any manner, such as through any sort of cabling, pushrods, bell cranks and/or other linkage(s) as appropriate.

Primary surface 102 may be at least partially actuated and/or retained by any sort of active or passive primary surface actuator 110. In various embodiments, actuator 110 is a conventional power actuator capable of supplying mechanical force to deflect or otherwise displace surface 102. In such embodiments, force applied by actuator 110 though linkage 112 works in conjunction with aerodynamic forces produced in response to the position of tab 104 to place primary surface 102 into a desired position. In other embodiments, actuator 110 is a passive device (e.g a disk brake, clutch or other type of holding device) that is capable of simply locking primary surface 102 into the desired position after surface 102 has been positioned by aerodynamic forces responding to the position of tab 104. In either case, actuator 110 typically responds to a control signal 114 provided by controller 118 to place and/or retain primary surface 102 as appropriate. Actuator 110 may be mechanically coupled to primary surface in any suitable manner, such as via any sort of cabling, pushrods, bell cranks and/or other linkage(s) 112.

Controller 118 is any device, system or logic capable of placing primary surface 102 into a desired position. In various embodiments, controller 118 is any type of microcontroller, microprocessor or other programmable device in a conventional feedback or control system. Such embodiments typically include software and/or firmware that is stored within any digital storage medium (e.g. a read-only, random-access, flash or other digital memory), and that is capable of being executed or interpreted by the underlying processing hardware. In various embodiments, the software instructions stored within controller 118 are able to coordinate the actions of actuator 108 and actuator 110 to place primary surface 102 into a desired position. That is, tab 104 may be positioned to create an aiding torque or other effect that can overcome loading forces and moments on primary surface 102, thereby reducing or eliminating the workload otherwise borne by primary surface actuator 110.

Figure 3:
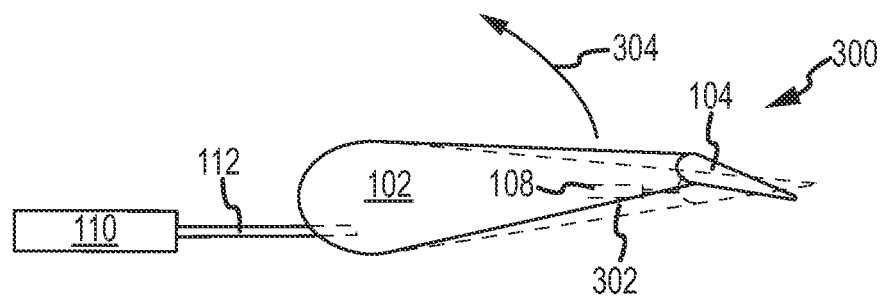
FIG. 3 is a block diagram of an exemplary flight control surface in a resultant position that is different from an aligned position of the airfoil.

FIGS. 3-6 show the control surface 100/200 in various exemplary stages of operation. With reference now to FIG. 3, an exemplary embodiment provides a resultant position that is slightly different from the aligned position 302 illustrated with dotted lines in the figures, wherein the primary surface 102 and tab 104 are generally aligned with each other and with incident airflows. When in position 300 shown in FIG. 3, surface 102 is placed into a position 300 that is in relatively close alignment with tab 104, but with the tab 104 actuated in an opposite direction from the primary surface 102 such that some aerodynamic force is applied to primary surface 102. Primary surface 102 is positioned and/or locked into place such that the aerodynamic forces applied to the airfoil 101 and/or aircraft itself would remain in relative balance, thereby allowing the position 300 to be used as a resultant position appropriate for the aerodynamic control of the airplane. The actual spatial relationship of tab 104 and primary surface 102 can be determined using conventional aerodynamic principles. In general, the relative positions of tab 104 and surface 102 may be selected based upon the gain of controller 118, the relative gearing of surface 102 and tab 104, and/or other design considerations as appropriate. Placement of surface 102 may be accomplished using an active actuator 110 and/or through aerodynamic effects created by tab 104.

In this embodiment, simply releasing the hold on primary surface 102 would allow aerodynamic effects produced by tab 104 to create a counter-clockwise moment 304 on primary surface 102, which would have the effect of increasing the displacement of the surface from the aligned position 302. This displacement, in turn, would produce aerodynamic effects upon the airfoil 101 and/or aircraft after the surface 102 was again locked into place. In this manner, primary surface 102 can be placed into a desired position to create aerodynamic results on the vehicle without significant power outlay for actuator 110. That is, a relatively low amount of electric and/or hydraulic power applied to actuator 108 can result in aerodynamic effects that can reduce or eliminate the need to provide power to actuator 110, thereby reducing the total power consumed to actuate primary surface 102.

Figure 4:
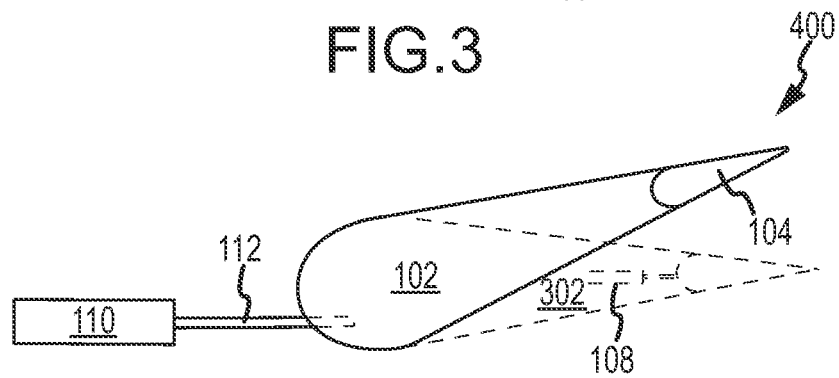
FIG. 4 is a block diagram of an exemplary flight control surface in a deflected position with a faired tab and the surface held in its desired position.

When the primary surface 102 reaches its commanded position, tab 104 may be faired (aligned) with primary surface 102 to increase the overall effect of the control surface, as shown in FIG. 4. Fairing can take place through actuation of actuator 108 after primary surface 102 is locked into place. In such embodiments, the full surface area of the control surface is restored into the air stream, thereby maximizing the load that the surface exerts on the airframe at the commanded position. The position 400 shown in FIG. 4 could be obtained through brute force applied by actuator 110 even in embodiments wherein tab 104 is not present. Electrical and/or hydraulic power can be conserved, however, by instead using aerodynamic force to place the primary surface 102 into position and then simply fairing the tab with actuator 108. As the control surface returns toward position 302, tab 104 may remain faired with respect to primary surface 102 to produce significant aiding loads to return surface 102 to a lesser deflection. This aiding load can be used to reduce surface position at a higher velocity. In further embodiments, the aiding load could capture some of the available energy for return to the aircraft power system (e.g. mechanical power generated by the aiding load could be converted to electrical energy that could be captured in a battery, capacitor or other energy storage device for subsequent use). In other embodiments, tab 104 may be returned to a different resultant position relative to primary surface 102, such as the position illustrated in FIG. 3.

Figure 5:
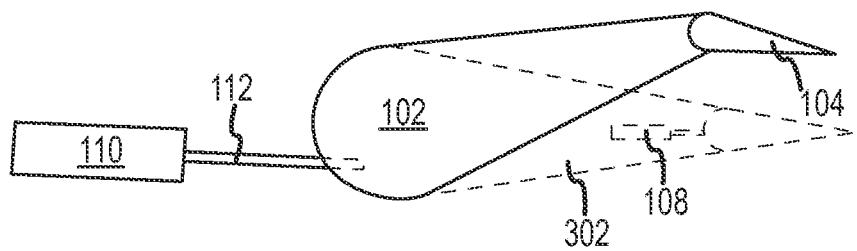
FIG. 5 is a block diagram of an exemplary flight control surface in a deflected position with a non-faired tab.

In an alternate to the FIG. 4 embodiment, tab 104 may remain in a non-faired position 400 with respect to primary surface 102, as illustrated in FIG. 5. In either the FIG. 4 or the FIG. 5 embodiment, actuator 110 may be actively used to position the primary surface at the desired rate (with assistance from aerodynamic effects) or actuator 110 may simply passively hold primary surface 102 at the desired position.

Figure 6:
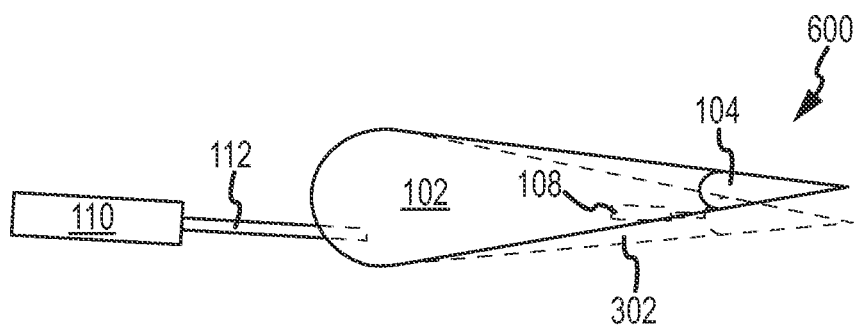
FIG. 6 is a block diagram of an exemplary flight control surface in a slightly deflected position with a faired tab.

FIG. 6 shows an exemplary configuration 600 wherein tab 104 remains faired with respect to primary surface 102 for relatively slight deflections of the control surface. In this embodiment, smaller movements of a larger control surface may be preferable to larger deflections of the smaller tab 104. In embodiments intended to reduce or eliminate radar reflections, for example, such movements may be beneficial. To that end, smaller movements (e.g. deflections less than about five degrees or so in one embodiment) of primary surface 102 may be performed using an active actuator 110. In such embodiments, however, larger movements that result in greater aerodynamic loads opposing further movement may be accomplished by actuating tab 104 as described above. By placing tab 104 at slight angle with respect to primary surface 102, for example, aerodynamic force can be generated to assist further movement of primary surface 102, as described above with respect to the FIG. 3 and FIG. 5 embodiments. As primary surface 102 reaches its desired position, tab 104 may be faired as shown in FIG. 4, or may remain in any deflected position, to achieve the desired aerodynamic effectiveness.

In a further embodiment, the active actuation 110 of primary surface 102 may be combined or supplemented with aerodynamic forces responding to the position of tab 104 in any manner. Aerodynamic actuation may be switched off at certain times, for example, when minimizing radar reflections is of primary concern. During such times, the tab 104 may remain in the faired position shown in FIG. 6. At times when radar reflections are a lesser concern, however, power may be conserved through the use of the aerodynamic effects created by tab 104 as described above.

Figure 7A:
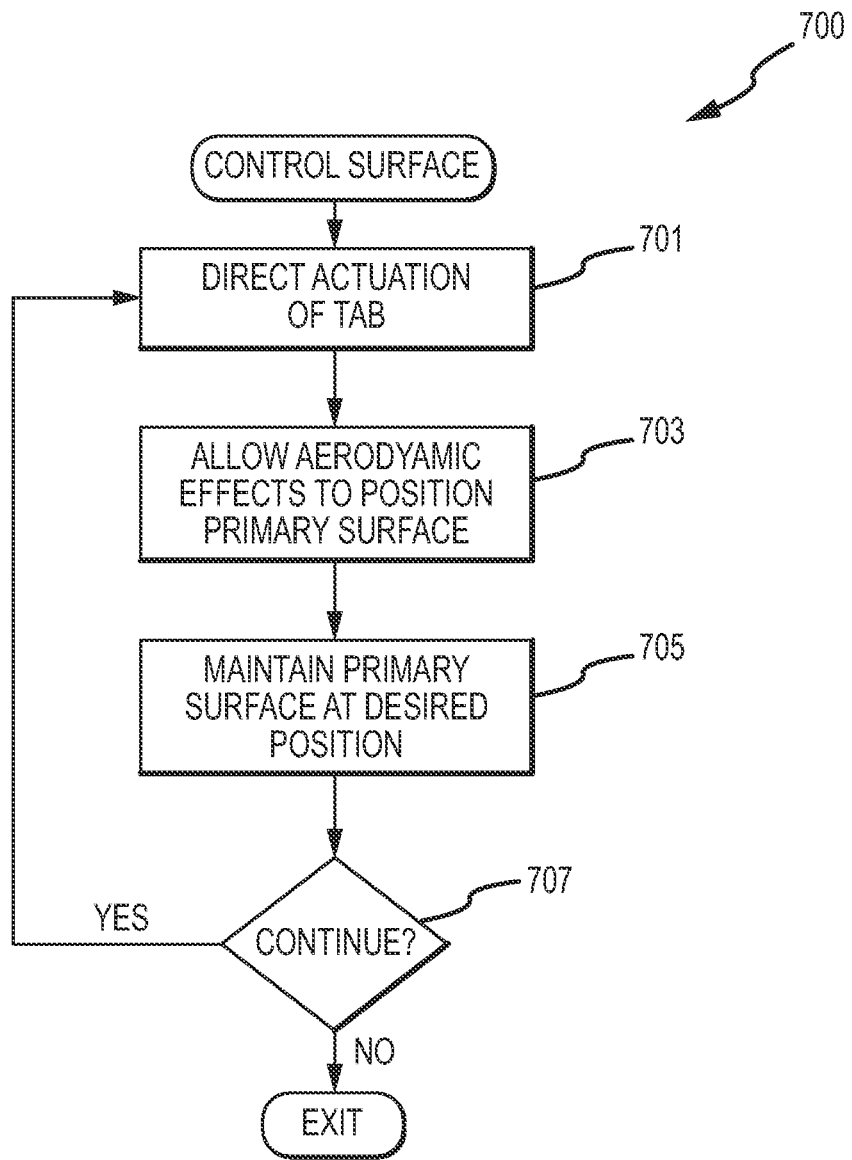
FIG. 7A is a flowchart of an exemplary technique for controlling a primary surface with a tab.

The actual control and coordination of actuators 108 and/or 110 can be performed in any manner. FIG. 7A, for example, shows one technique 700 for controlling a primary surface with a tab located on a leading or trailing edge of the surface. This technique 700 generally includes the broad steps of directing the actuation of tab 104 (step 701), allowing aerodynamic effects to position the primary surface 102 as desired (step 703), and then maintaining the primary surface 102 at the desired position (step 705). Technique 700 may be repeated as desired (step 707) to continually position and/or reposition primary surface 102. In various embodiments, technique 700 is implemented using conventional control systems and techniques. Conventional hardware, software and/or firmware logic, for example, implemented within controller 118 or elsewhere could be used to process and execute the various steps of technique 700 as appropriate.

Step 701 suitably involves providing any sort of control signal or other command to place tab 104 into an appropriate position to create desired aerodynamic effects. Typically, this involves placing tab 104 at a deflected position with respect to the primary surface 102 when movement of primary surface 102 is desired; various examples of positioning techniques that can create desired movement of control surface 102 are described above. Tab 104 may be placed in any manner; in various embodiments, tab 104 is positioned with respect to primary surface 102 by actuator 108, or the like. Conversely, actuator 108 is directed by a control signal 116 from controller 118 or the like. In various embodiments, controller 118 responds to a command signal 115 to place primary surface 102 into any desired position. The desired position may be obtained through any combination of forces applied by actuator 108, actuator 110 and/or aerodynamic force generated from the position of tab 104 with respect to surface 102. Once tab 104 is properly positioned, aerodynamic effects act upon primary surface 102 until it is placed in its desired position (step 703). The desired position may be maintained (step 705) through actuation of tab 104 and/or surface 102, through application of a passive "brake" on surface 102, and/or though any other technique. Again, process 700 may be repeated (step 707) as needed to achieve proper positioning and operation of control surface 102 as desired.

Various techniques could be used to generate the proper control signals 114 and/or 116 that are applied to actuators 110 and/or 108, respectively. Many different control techniques/systems may be implemented in controller 118, for example, using conventional hardware, software and/or firmware logic and conventional control system techniques. As shown in FIG. 7B, for example, a simple control system 725 could include a conventional proportional-integral-derivative (PID) controller 706 that drives a tab command signal 116 to place tab 104 into a desired position. In this embodiment, the negative difference between the commanded position 115 and the actual position 702 of primary surface 102 is input to the PID controller 706 as appropriate. Generally speaking, tab 104 will be driven in the opposite direction of the commanded position 115, and will return to the neutral position when primary surface 102 reaches its commanded position. In various embodiments, a conventional dead-zone filter 704 may be applied to prevent over-reaction to relatively slight differences in surface position. Similarly, a saturation filter 708 may be applied to the output of PID controller 708 to prevent unusually large or sudden changes in tab command 116. In this embodiment, both primary surface 102 and tab 104 can be actively actuated, with tab 104 used to reduce the amount of power applied to actuate primary surface 102 as described above.

In a further embodiment, the simple control scheme 700 shown in FIG. 7B may be enhanced or supplemented in any manner. In the embodiment shown in FIG. 7C, for example, the basic tab command generated by controller 706 is determined from the negative difference between control surface command 115 and control surface position 702, as described above. Enhancements are provided to drive the tab command 116 to a neutral position relative to the primary surface 102 when the primary surface 102 is returning to its neutral position. That is, the tab 104 is only used to assist surface 102 under resisting load conditions. In practice, this may be accomplished by multiplying the rate of change of surface command signal 115 by the surface position 702. In the embodiment of FIG. 7C, the rate of change in the surface command signal 115 is determined in logic 720, with logic 722 comparing the increasing or decreasing rate to the current position of surface 102 to thereby adjust signal 116 accordingly. As surface 102 is commanded to a position that is closer to neutral, for example (e.g. the commanded position 115 is an opposite sign of the actual position 702), the tab 104 can be commanded to a neutral position with respect to the primary surface 102, or otherwise directed as appropriate.

Figure 7D:
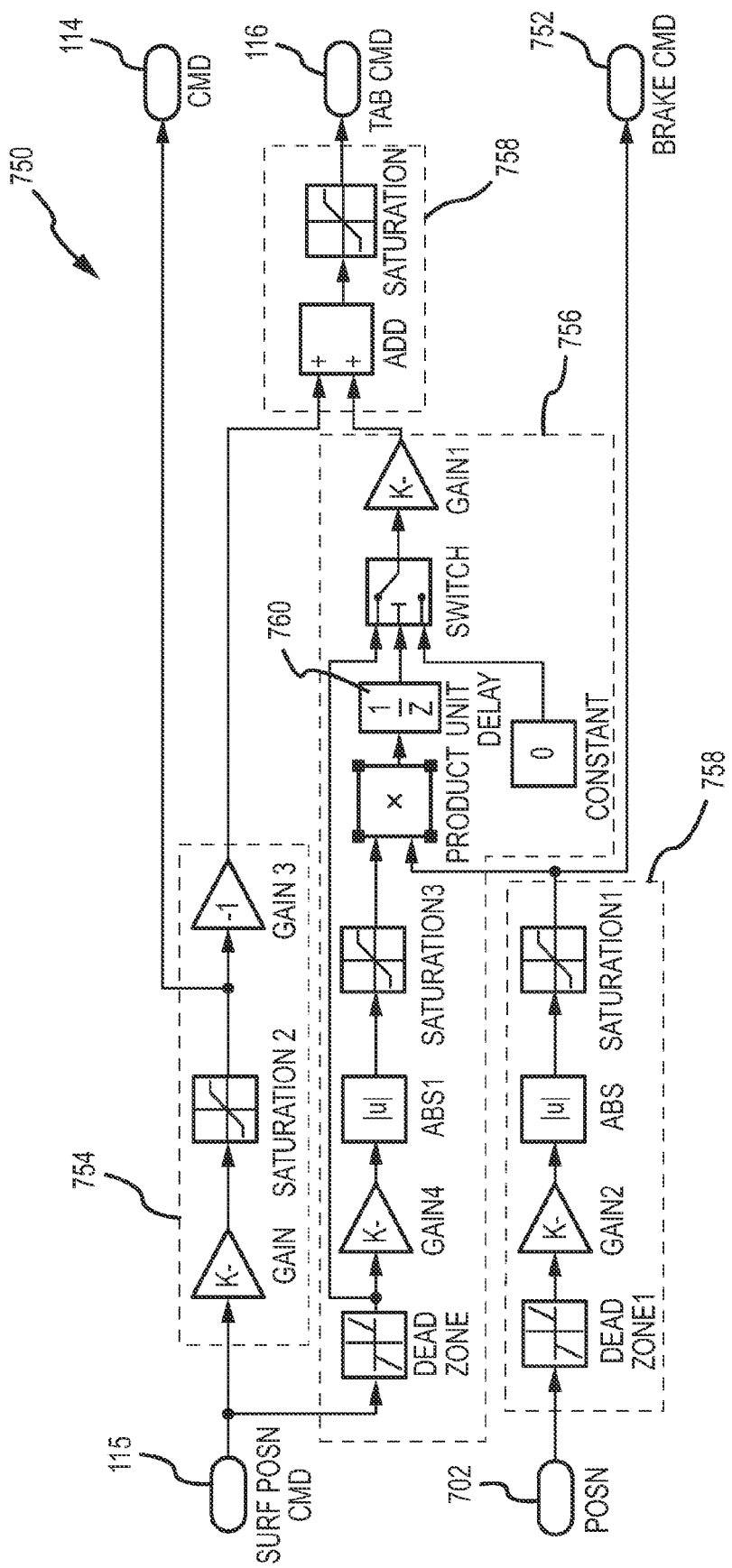
FIG. 7D is a block diagram of an exemplary control scheme suitable for use in generating tab and brake control signals.

Other modifications and/or enhancements could be provided in other embodiments. FIG. 7D, for example, shows an exemplary control scheme 750 that is capable of generating a tab control signal 116 and a brake control signal 752 (e.g. to a passive actuator 110), as well as an a command signal 114 to primary surface 102, if desired. Generally speaking, the tab command 116 is generated by logic 756 and 758 to be the opposite of the primary surface command 114, amplified as desired to drive the primary surface to the desired position. In this case, however, the desired position of primary surface 102 may be modified somewhat due to the effects of the deflected tab 104 (e.g. as described above with respect to FIG. 5; that is, due to the passive activation of primary surface 102, tab 104 is deflected (e.g. placed at full deflection) until the primary surface reaches its desired effective position, accounting for the continued effects of the deflected tab 104. The brake command 752 is generated by logic 758 in response to the position 702 of primary surface 102 exceeding the desired position; at that point, the brake can be set, and tab 104 can be actuated to its faired position (e.g. FIG. 4), or the tab may remain deflected as desired for the particular embodiment. Command signal 114 may be readily implemented by simply amplifying and/or filtering the surface position command 115 as appropriate with logic 754. In this embodiment, then, tab 104 may be used to "fly" primary surface 102 to its desired position, where surface 102 can then be locked into place as desired. Various modifications can be applied to the particularly logic shown in the figure; for example, FIG. 7D shows a unit delay 760 that is used to model the delay time used to set the "brake", thereby locking the primary surface 102 into position. This value may be adjusted or eliminated in other embodiments. The other logic blocks shown in the figures could be similarly modified, enhanced, or replaced with any number of equivalent logical elements.

Figure 8A:
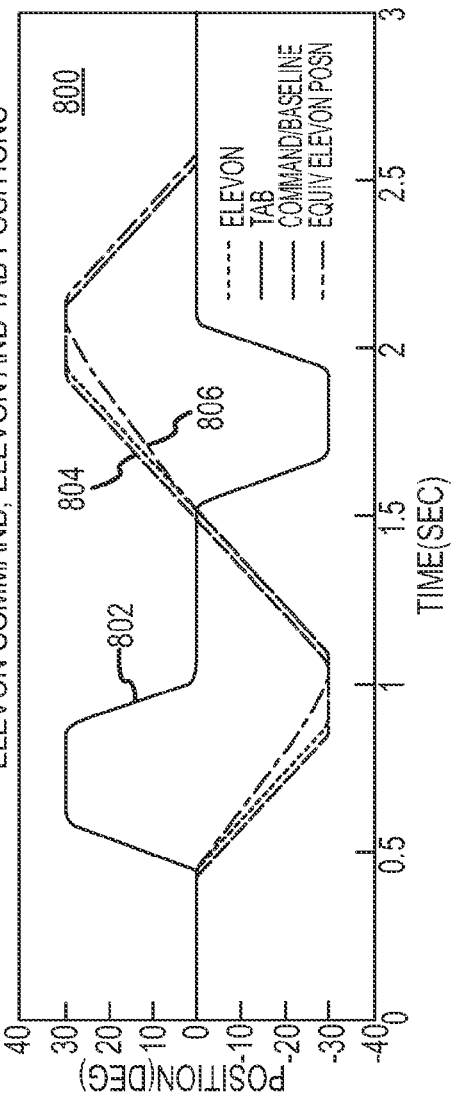
FIGS. 8A-C is a series of plots showing exemplary performance of a control system that coordinates the actions of a primary control surface and a tab.
Figure 8B:
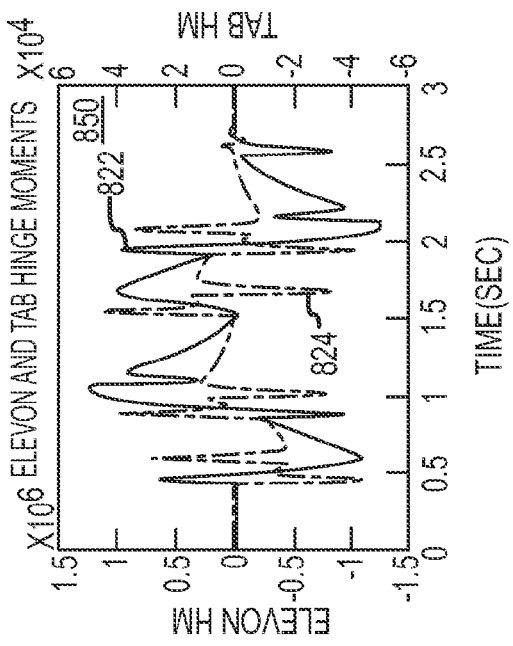
Figure 8C:
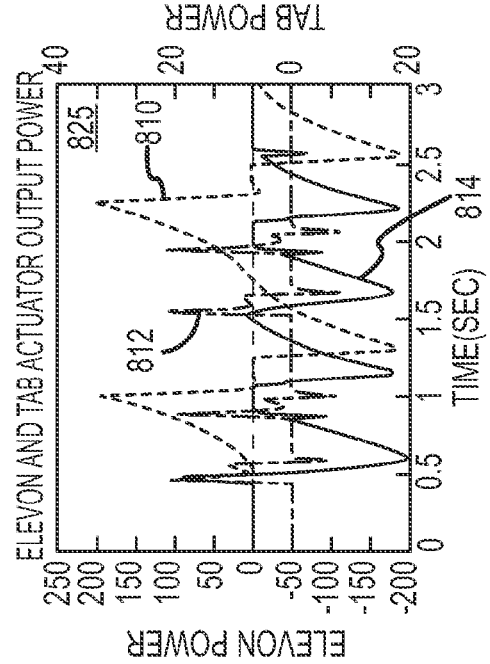

FIGS. 8A-C show various plots 800, 825, 850 that demonstrate the effectiveness and efficiency of an exemplary embodiment that implements the control scheme described above with respect to FIG. 7B. Plot 800 of FIG. 8A, for example, shows an exemplary scenario wherein a position 806 of a primary surface 102 closely tracks command signal 804 (which may correspond to signal 115 in FIGS. 1 and 2). As shown in the plot, deflection of tab 104 in a direction opposite the desired deflection of surface 102 can result in relatively fast realization of the desired position of the surface, and very good tracking of command signal 804 by the primary surface position shown by signal 806.

FIGS. 8B and 8C provide plots 825 and 850 that compare actuator output power and hinge moments, respectively, used to place primary surface 102 into a desired position using actuators 108 and 110. As shown in FIG. 8B, the power 812 used to actuate tab actuator 108 is approximately 20% of the power 810 used to obtain an equivalent position with brute force applied by surface actuator 110. Trace 814 shows the power applied to move primary surface 102 due to the aerodynamic loading motion of the tab 104, and also shows significant power can be returned to the aircraft power system if actuator 110 or 210 and the power system are configured to do so. From plot 825, then, it can be seen that significant power savings can be obtained through the use of tab actuation to harness aerodynamic effects. Similarly, FIG. 8C shows that aerodynamic and inertial hinge moments 824 applied to tab 104 are approximately two orders of magnitude less than the hinge moments 822 applied by the tab to the primary surface 102. While particular results may vary significantly in other embodiments, the various plots shown in FIGS. 8A-C demonstrate that a considerable power savings may be available from various embodiments without appreciable effects on performance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:
1. A flight control for an aircraft, the flight control comprising:
   a primary surface that is moveable with respect to the aircraft;
   a primary surface actuator coupled to the primary surface and configured to maintain a position of the primary surface;

a tab located at an edge of the primary surface and coupled to the primary surface to allow movement of the tab with respect to the primary surface;

a tab actuator coupled to the tab and configured to move the tab with respect to the primary surface; and a controller coupled to the primary surface actuator and to the tab actuator, configured to coordinate the movement of the primary surface with the movement of the tab by controlling the tab actuator in a manner that allows aerodynamic forces acting on the tab, in concert with a mechanical force of the primary surface actuator, to position the primary surface at a desired deflected position, and to fair the tab and hold the tab in alignment with the primary surface while maintaining the primary surface at the desired deflected position.

2. The flight control of claim 1 wherein the primary surface actuator is an active actuator configured to exert a force upon the primary surface in response to a primary surface control signal received from the controller.

3. The flight control of claim 1 wherein the primary surface actuator is a passive actuator configured to lock the primary surface into position in response to a primary surface control signal received from the controller.

4. The flight control of claim 1 wherein the primary surface and tab comprise a trailing edge of an airfoil.

5. The flight control of claim 4 wherein the airfoil is selected from the group consisting of a wing, a horizontal stabilizer, a canard and a vertical tail.

6. The flight control of claim 1 wherein the primary surface and tab comprise an airfoil selected from the group consisting of an elevon, an aileron, a flap and a rudder.

7. A method of controlling a primary flight control surface of an aircraft, the primary flight control surface having a tab located at an edge thereof that is moveable with respect to the primary flight control surface, the method comprising the steps of:

directing the actuation of the tab to deflect the tab with respect to the primary flight control surface in a direction opposite to a desired direction of deflection of the primary flight control surface;

applying a primary surface control signal from a controller to a primary surface actuator coupled to the primary flight control surface;

allowing aerodynamic forces acting upon the deflected tab, in concert with a mechanical force of the primary surface actuator, to deflect the primary flight control surface in the desired direction and position the primary flight control surface at a desired deflected position;

subsequently maintaining the primary flight control surface at the desired deflected position; and while maintaining the primary flight control surface at the desired deflected position, fairing the tab and holding the tab in alignment with the primary flight control surface.

8. The method of claim 7 wherein the directing step comprises applying a tab control signal from a controller to a tab actuator coupled to the tab.

9. The method of claim 7, wherein the maintaining step comprises locking the primary flight control surface into position in response to a primary surface control signal provided from a controller.

10. The method of claim 7 further comprising the step of positioning the primary flight control surface and the tab into a default position during level flight of the aircraft.

11. The method of claim 10 wherein the default position is different from a position wherein the primary flight control surface is substantially aligned with incident airflows.

12. The method of claim 11 wherein the default position comprises a first deflection of the primary flight control surface from the aligned position in a first direction, and a second deflection of the tab from the aligned position in a second direction opposite the first direction.

13. The method of claim 7 further comprising the step of, prior to the deflecting step, fairing the tab with respect to the primary flight control surface and actuating the primary flight control surface with an actuator.

14. The method of claim 13 wherein the directing step is executed when a commanded deflection of the primary flight control surface exceeds a threshold level.

15. A control system for an aircraft having a primary flight control surface that is pivotable with respect to the aircraft and a tab that is located at the edge of the primary flight control surface, wherein the tab is coupled to allow movement of the tab with respect to the primary flight control surface, the control system comprising:

a primary surface actuator coupled to the primary flight control surface and configured to maintain a position of the primary flight control surface;

a tab actuator coupled to the tab and configured to rotate the tab with respect to the primary flight control surface; and a controller coupled to the primary surface actuator and to the tab actuator, wherein the controller is configured to coordinate the movement of the primary flight control surface with the movement of the tab by deflecting the tab with respect to the primary flight control surface, thereby allowing aerodynamic forces acting upon the deflected tab, in concert with a mechanical force of the primary surface actuator, to position the primary flight control surface at a desired deflected position, and then subsequently maintaining the primary flight control surface at the desired deflected position and fairing and holding the tab in alignment with the primary flight control surface at the desired position.

16. The control system of claim 15 wherein the controller is further configured to drive the tab to a neutral position relative to the primary surface when the primary surface is returning to its neutral position.

17. The control system of claim 15 wherein the controller is configured to maintain the primary flight control surface at the desired deflected position by producing a brake signal applied to the primary surface actuator.

18. The control system of claim 17 wherein the brake signal is generated in response to the position of the primary flight control surface exceeding the desired deflected position.

19. The control system of claim 15 wherein the controller is further configured to direct the actuation of the primary surface actuator to further control the primary flight control surface.

* * * * *